United States Patent
Epars et al.

(10) Patent No.: US 8,468,934 B2
(45) Date of Patent: Jun. 25, 2013

(54) DISPENSING DEVICE FOR PREPARING AND DISPENSING FOOD AND/OR NUTRITIONAL COMPOSITION

(75) Inventors: Yann Epars, Penthalaz (CH); Antoine Ryser, Lausanne (CH)

(73) Assignee: Nestec S.A., Vevey (CH)

( * ) Notice: Subject to any disclaimer, the term of this patent is extended or adjusted under 35 U.S.C. 154(b) by 648 days.

(21) Appl. No.: 12/675,630

(22) PCT Filed: Jun. 24, 2008

(86) PCT No.: PCT/EP2008/057979
§ 371 (c)(1),
(2), (4) Date: Feb. 26, 2010

(87) PCT Pub. No.: WO2009/027131
PCT Pub. Date: Mar. 5, 2009

(65) Prior Publication Data
US 2010/0300299 A1    Dec. 2, 2010

(30) Foreign Application Priority Data

Aug. 29, 2007    (EP) .................................... 07115146

(51) Int. Cl.
*A47J 31/44* (2006.01)
*A47J 31/60* (2006.01)
*A47J 31/36* (2006.01)

(52) U.S. Cl.
CPC .............. *A47J 31/3695* (2013.01); *A47J 31/44* (2013.01); *A47J 31/60* (2013.01)
USPC .................... 99/295; 99/288; 222/81; 222/83; 222/148

(58) Field of Classification Search
CPC ........... A47J 31/3695; A47J 31/44; A47J 31/60

USPC .............................. 99/288, 295; 222/81, 148
See application file for complete search history.

(56) References Cited

U.S. PATENT DOCUMENTS 4,644,855 A * 2/1987 Woolman et al. ................ 99/280
5,064,097 A * 11/1991 Brog et al. ..................... 222/129

(Continued)

FOREIGN PATENT DOCUMENTS

| CA | 2209564 A1 | 8/1996 |
| EP | 0658330 A | 6/1995 |

(Continued)

OTHER PUBLICATIONS

International Search Report for International Application No. PCT/EP2008/057979 mailed Sep. 12, 2008.

(Continued)

*Primary Examiner* — Gene Kim
*Assistant Examiner* — Alexander Niconovich
(74) *Attorney, Agent, or Firm* — K&L Gates LLP (57) ABSTRACT

Dispensing device for preparing and dispensing food and/or nutritional composition comprising: a water circuit for transporting water, a water heater, an injection head (4) comprising an injection intruding part (25, 38) for injecting water in a capsule comprising the food and/or nutritional ingredient; a capsule holder (17) for holding the capsule during injection of water in the capsule, wherein the injection head and capsule holder are moveable relatively one another for approaching the capsule surface to the injection head and injecting water in the capsule, wherein it also comprises a cleaning and/or sanitizing means (13) which can be associated to the injection system for enabling hot water and/or steam to clean and/or sanitize the external surface of the injection intruding part.

30 Claims, 4 Drawing Sheets

U.S. PATENT DOCUMENTS

| | | | | |
|---|---|---|---|---|
| 5,302,407 | A | * | 4/1994 | Vetterli ......................... 426/433 |
| 5,398,595 | A | * | 3/1995 | Fond et al. ..................... 99/295 |
| 5,472,719 | A | * | 12/1995 | Favre ............................ 426/77 |
| 5,551,988 | A | * | 9/1996 | Reyhanloo et al. .......... 134/22.1 |
| 5,762,987 | A | * | 6/1998 | Fond et al. .................... 426/433 |
| 5,794,519 | A | * | 8/1998 | Fischer ......................... 99/295 |
| 5,897,899 | A | * | 4/1999 | Fond ............................ 426/112 |
| 6,182,554 | B1 | * | 2/2001 | Beaulieu et al. ............ 99/289 R |
| 7,017,595 | B2 | * | 3/2006 | Jager ............................ 134/25.2 |
| 7,353,752 | B2 | * | 4/2008 | Blanc ............................ 99/298 |
| 7,377,454 | B2 | * | 5/2008 | Klopfenstein et al. ........ 239/335 |
| 7,562,618 | B2 | * | 7/2009 | Jarisch et al. ............... 99/289 R |
| 7,571,674 | B2 | * | 8/2009 | Wang ............................ 99/302 P |
| 7,673,558 | B2 | * | 3/2010 | Panesar et al. ................. 99/295 |
| 7,762,180 | B2 | | 7/2010 | Brouwer et al. |
| 7,946,217 | B2 | * | 5/2011 | Favre et al. ..................... 99/295 |
| 8,033,211 | B2 | * | 10/2011 | Halliday et al. ................ 99/295 |
| 8,087,347 | B2 | * | 1/2012 | Halliday et al. ................ 99/295 |
| 8,176,714 | B2 | * | 5/2012 | Abegglen et al. .............. 53/452 |
| 8,250,972 | B2 | * | 8/2012 | Santoiemmo ................ 99/323.2 |
| 8,256,342 | B2 | * | 9/2012 | Jarisch et al. ............... 99/289 R |
| 2002/0023543 | A1 | * | 2/2002 | Schmed ........................ 99/295 |
| 2003/0066431 | A1 | * | 4/2003 | Fanzutti et al. ................ 99/279 |
| 2006/0156928 | A1 | * | 7/2006 | Wang ............................. 99/280 |
| 2010/0021604 | A1 | * | 1/2010 | Roulin et al. ................. 426/506 |
| 2010/0159109 | A1 | * | 6/2010 | Van Puijenbroek et al. .. 426/594 |
| 2012/0118164 | A1 | * | 5/2012 | Tonelli et al. .................. 99/280 |

FOREIGN PATENT DOCUMENTS

| | | |
|---|---|---|
| EP | 1502529 A | 2/2005 |
| WO | WO03059778 A2 | 7/2003 |
| WO | WO2004049878 A | 6/2004 |
| WO | WO2005053486 A | 6/2005 |

OTHER PUBLICATIONS

Written Opinion for International Application No. PCT/EP2008/057979 mailed Sep. 12, 2008.

Braun Reinigungs-Disc fur Tassimo Heibgetrankesystem aus http://google.de/search?q=braun+reinigungsdisc, Anlage E4, Apr. 26, 2012 (1 page).

Photo eines Typenschildes eines Kapsel-Kaffeemaschine der Firma Braun mit der Bezeichnung Type 3170, Anlage E7 (2 pages).

Braun Reinigungs-Disk fur Tassimoheibgetrankesystem, Anlage E5, Apr. 26, 2012, (1 page).

Eidesstattliche Versicherung, Anlage E2 (3 pages).

Tassimo: Das intelligente Heibgetranke-System—BILD, Utk.: Kraft Foods belebt den Markt der Heibgetranke, Aug. 23, 2006 (6 pages).

Braun Tassimo User Manual (10 pages).

Braun Tassimo Hot Beverage System, Bed Bath & Beyond Product Description, web.archive.org/web/20060426174836/http://www.bedbathandbeyond.com/product.asp?order_n... May 21, 2012 (2 pages).

Photos (Radial passage, central outlet and cylindrical recess) (2 pages).

Braun Tassimo photos, Type 3107, Machine Code 7.1.02.03.508, (7 pages).

Braun Tassimo User Instructions, Type 3107 (15 pages).

Braun Tassimo Freshly Brewed Coffee, Cappuccino and Hot Drinks Machine (silver), Amazon product information, web.archive.org/web/20050615080623/http://www.amazon.co.uk/exec/.../system-requirements, Jul. 5, 2012 (2 pages).

Braun Tassimo Freshly Brewed Coffee, Cappuccino and Hot Drinks Machine (silver), Amazon product information, web.archive.org/web/20051124091233/http://www.amazon.co.uk/exec/obidos/ASIN/B000795X4C, May 17, 2012 (2 pages).

Tassimo FAQs, Sep. 16, 2011, http://web.archive.org/web/20051231214222/http://www.tassimodirect.com/Tassimo/... (2 pages).

Tassimo On-Line Order Receipt for Purchase of Tassimo Hot Beverage System #N70, Sep. 16, 2011 (4 pages).

Tassimo Hot Beverage System Press Release, May 21, 2012 (2 pages).

Tassimo Hot Beverage System from Single Serve Coffee.com | Single Serve . . . Product Review of Tassimo Hot Beverage System, Aug. 30, 2005 (5 pages).

Elektrische Heizelemente, Electrical Heating Elements, PTC—Technology, Edition 2005 (4 pages).

* cited by examiner

DISPENSING DEVICE FOR PREPARING AND DISPENSING FOOD AND/OR NUTRITIONAL COMPOSITION

The present invention relates to a dispensing device for preparing a food and/or nutritional composition.

THE BACKGROUND ART

Dispensing equipment can greatly facilitate ease of preparation of food or nutritional compositions. Nutritional compositions encompass, for instance, infant formula or preparations for subjects with an immature or compromised immune systems or elderly population. However, such uses bring with it new safety concerns. It is absolutely critical that sensitive nutritional compositions such as infant formulas or other food compositions are delivered in a convenient but in the safest manner on a microbiological standpoint. Therefore, the dispensing equipment must be clean and safe for each preparation cycle.

European co-pending patent application No. 06117801.8 filed 25 Jul. 2006 relates to a dispenser for preparing a nutritional composition comprising a reservoir, water heating means and water discharge means wherein a bacterial filter is provided between the water heating means and the water discharge means such that heated water passes the filter prior to discharge from the dispenser. A steam generator may be provided such that the interior of the water discharge means and/or filter may be cleaned by the passage of steam during each cycle of operation.

WO2004/049878 relates to a mechanically and hydrodynamically operated brewing unit for automatic beverage vending machines. This device has no cleaning and/or sanitizing function.

EP0658330A relates to a method and apparatus for cleaning a brewing device especially of a coffee machine. The device is for cleaning a brewing cylinder which receives ground coffee directly. The device works on the principle that a brewing cylinder comprising a brewing piston is rotated and connected to an external water supply. Water is supplied for rinsing the inside surface of the brewing cylinder and pushed by the piston of the brewing cylinder. The whole chamber of the cylinder must be cleaned. This invention is not suited for preparing a nutritional composition in a hygienic manner.

There is a need for improving the hygiene and microbiological safety level of a dispenser designed for delivering food and/or nutritional compositions, in particular, prepared from a capsule containing a food and/or nutritional ingredients.

Cleaning, sanitizing or descaling procedures are also complicated and must be carried out at specific times. There is a need for automated procedures. In particular, there is a need for avoiding the user to proceed himself to collecting in a recipient of the cleaning liquid, steam or hot water during these procedures.

SUMMARY OF THE INVENTION

Accordingly, the invention provides
a dispensing device for preparing and dispensing a food and/or nutritional composition from a capsule containing food and/or nutritional ingredients comprising:
a water circuit for transporting water,
a water heater,
an injection head comprising an injection intruding part for injecting water in a capsule comprising the food and/or nutritional ingredients;
a capsule holder for holding the capsule during injection of water in the capsule,
wherein the injection head and capsule holder are moveable relatively one another for approaching the capsule surface to the injection head and injecting water in the capsule,
wherein it comprises cleaning and/or sanitizing means arranged to inject a cleaning agent in at a least a portion of the water circuit and through the injection intruding part, comprising a collecting means which can be associated in engagement with the injection head for enabling the collecting means to collect and discard the cleaning agent after it has passed through the injection intruding part The invention also relates to a dispensing device for preparing and dispensing a food and/or nutritional composition from a capsule containing food and/or nutritional ingredients comprising:
a water circuit for transporting water,
a water heater,
an injection head comprising an injection intruding part for injecting water in a capsule comprising the food and/or nutritional ingredient;
a capsule holder for holding the capsule during injection of water in the capsule,
wherein the injection head and capsule holder are moveable relatively one another for approaching the capsule surface to the injection head and injecting water in the capsule,
wherein it comprises cleaning and/or sanitizing means which are arranged to inject a cleaning and/or sanitizing agent through the injection intruding part comprising a cover which can be associated in engagement with the injection head for forcing the cleaning and/or sanitizing agent to clean and/or sanitize the external surface of the injection intruding part.

The cleaning agent is preferably steam and/or hot water.

Other possible cleaning agents can be a liquid formed from a mixture of chemical sanitizing materials with water or alternatively a sanitizing gas.

The injection intruding part is meant to be surfaces of the injection head which enter the capsule for the purpose of creating at least one opening in the capsule and/or injecting water within the capsule.

In particular, the injection intruding part may comprise at least one needle that is designed to be introduced through a wall of the capsule. The needle can be designed to pierce a wall of the capsule. The needle becomes at least partially introduced in the capsule and may be in contact with the food and/or nutritional ingredients. Therefore, one principle of the invention is to provide a clean-in-place system which can clean and/or sanitize at least the surfaces of the needle which comes into contact with the ingredients or liquid in the capsule. The clean-in-place system preferably cleans and/or sanitizes also the following surfaces: an internal fluid conduit and/or a filter placed upstream of the needle.

The cleaning and/or sanitizing means usually comprises a steam generator for introducing steam through the injection intruding part. The steam generator can be a heating device such as a thermoblock, a cartridge heater, a heat plate exchanger or any other suitable device.

The system comprises a principal fluid circuit that provides hot or cold water to the injection means and a secondary fluid circuit that can be connected to the main fluid circuit and that provides a cleaning agent to the principal fluid circuit for cleaning at least a part of, preferably, the water injection part of, the principal fluid circuit. The secondary cleaning fluid circuit can comprise a steam generator in which case the cleaning and/or sanitizing agent is steam or for instance a circuit with a separated reservoir for chemicals in tablet, powder or liquid form, in which case the cleaning and/or sanitizing agent is a chemical agent. The cleaning agent could be a gas or a liquid.

The cleaning agent may also be a descaling agent.

The cleaning cover allows the cleaning agent to clean the principal fluid circuit up to the outlet as well as the external surfaces of the water injection means which contact the food or nutritional product in the capsule.

The cleaning and/or sanitizing means may further comprises a steam cover which is arranged for covering the injection protruding part during steam injection through the injection system and for forcing steam to clean and/or sanitize the external surface of the injection intruding part. Therefore, according to one principle of the invention, steam is brought and maintained in contact with the external surface of the injection protruding part in a manner effective to clean and/or sanitize the part.

In the context of the invention, "cleaning" refers to the removal of food liquid and/or solid residues including the operation of descaling. In the context of the invention also, "sanitizing" refers to the total or partial destruction of the microbial life at the surface of the part.

Preferably, the injection head comprises a fluid-tight sealing means configured for providing a sealing arrangement at least locally around the injection intruding part when the injection head is engaged against the capsule. This configuration provides the advantage that only the injection intruding part is potentially contaminable by liquid whereas the rest of the injection head does not come in contact with liquid and hence remains clean after each preparation cycle.

In an embodiment, the collecting cover is moveable relatively to the injection head to take a disengaging position in which the collecting cover is distant from the injection system when the injection head is moved to the capsule for water injection and an engaging position, in the cleaning/sanitizing mode, in which the collecting cover is associated with the injection system of the injection head for sanitizing and/or cleaning by the injected steam the surface of the injection system.

The injection head and cover head can also be mechanically associated in a manner that, when the injection head and/or capsule holder are moved apart, the cover head is moved into the engaging position automatically. For instance, cam means may be provided for forcing the cover in engagement with the injection intruding part. Furthermore, the cover can be mounted in a pivotable manner on the injection head or alternatively on the capsule holder and be activated by mechanical transmission means, e.g. cam means, into the engaging position. Therefore, the cleaning and/or sanitizing means is put in place in a coordinated and automatic manner with the disengagement of the injection head relatively to the capsule.

In one embodiment, the injection head is made moveable towards the capsule holder in the engaging position of injection.

In a possible embodiment, this is the capsule holder which is made moveable towards the injection head in order to bring the inlet wall of the capsule closer to the head and to become traversed, i.e., pierced or punctured, by the intruding part.

For instance, the cover head can be mounted on the injection head or, alternatively, on the capsule holder, by a rotational connection and can be guided along a cam means to move between the engaging and disengaging positions in a coordinated manner as the injection head is moved in opening or, alternatively, as the capsule holder is moved apart from the injection head.

The collecting cover is preferably connected to a drain for removal of the cleaning and/or sanitizing steam. The removal of steam enables to remove the food/liquid residue as well as micro-organisms (e.g., biofilm) at the surface of the intruding part of the injection system. For this, the collecting cover can comprise an opening and a duct connected to the drip tray or a container (i.e., glass vessel) of the dispensing device.

Preferably, the collecting cover engages the injection system in a fluid tight manner relative to the surroundings in the device. This ensures that steam does not escape in an uncontrolled manner which could otherwise cause burns or other damages. Also, the waste liquid or steam is confined in the area of the injection intruding part and can be so collected entirely without messing the other areas, in particular, other surfaces of the injection head and of the device.

In another aspect of the invention, the device comprises a controller for automatically operating a cleaning and/or sanitizing operation. The cleaning and/or sanitizing operation can be carried out before the cycle of preparation of the beverage and/or after a cycle of preparation of the beverage.

This invention allows automatic cleaning/sanitizing and/or descaling of the device in that the used cleaning agent is automatically collected.

DETAILED DESCRIPTION OF PREFERRED EMBODIMENTS

The present invention is primarily directed to conveniently and safely cleaning and/or sanitizing the sensitive water injection parts and surfaces of a dispensing device using capsules in order to maintain these parts clean and safe for each new preparation cycle with the capsule.

One aspect of the invention is for instance to clean and/or sanitize the external surfaces of the part of the injection system which contacts the food or nutritional ingredients or mixture of food or nutritional ingredients and water in the capsule. Another aspect is to minimize the surface area of the device which can be in contact with the food or nutritional liquid.

The advantages may be amongst other possible:

Firstly, regarding hygiene, the invention minimizes the risk of microbial contamination and growth at the surface of the injection part and, therefore, maintains hygiene at each cycle of preparation of the composition, Secondly, regarding user's convenience, the device collects automatically the cleaning agent thus removing the burden on the user to carry out this task.

Thirdly, considering safety, the invention also helps remove food residues that may block the water injection inlet and may therefore create injection problems such as a significant reduction of the water flow rate.

The dispensing device according to the invention is particularly suitable for use with individually packaged unit dose of food and/or nutritional composition to be prepared, called "capsule" in the present description. The term "capsule" encompasses portioned packages such as plastic and/or metal cartridges, sachets, pods and the like.

Figure 1:
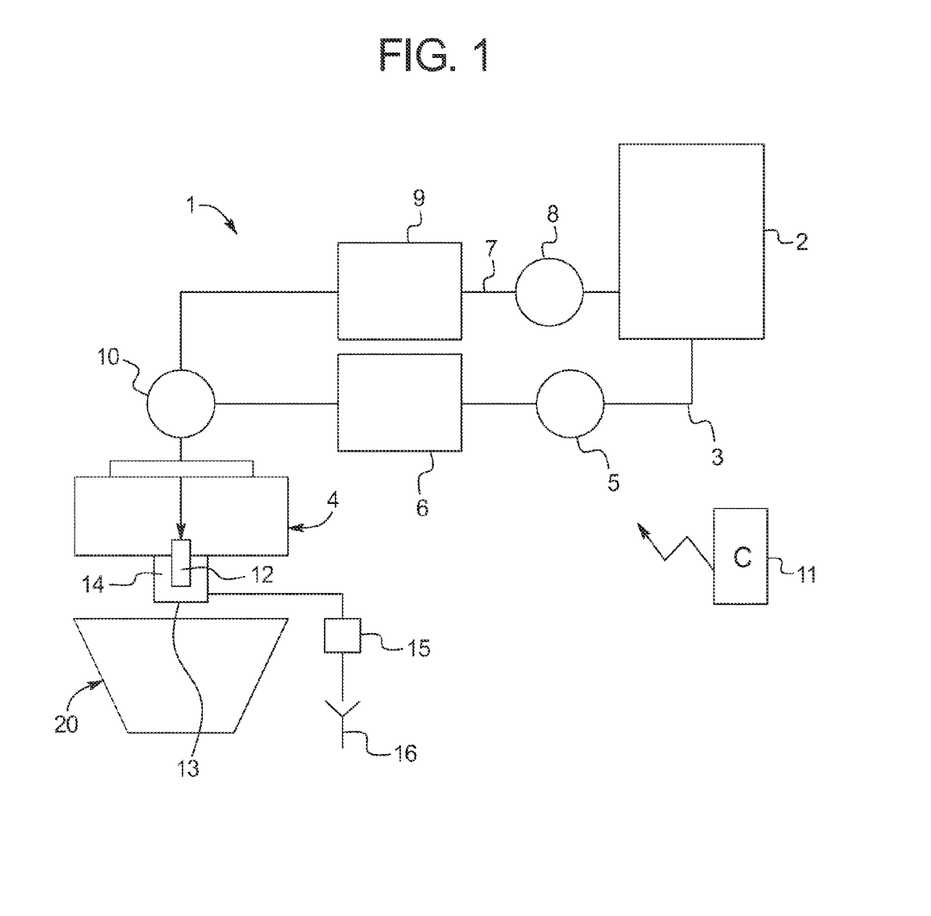
FIG. 1 shows schematically an embodiment of the dispensing device of the invention.

FIG. 1 illustrates a general embodiment of the invention in schematic representation. The dispenser 1 of the invention is configured to receive a capsule 20. The dispenser comprises a water reservoir 2 provided with fresh water from the tap or from (e.g., mineral or water source) bottles. A water circuit 3 is provided to circulate the water from the reservoir to an injection head 4. In the water circuit, water is transported under pressure by means of a water pump 5. The pump can be a piston pump, a diaphragm pump, a peristaltic pump or any other suitable pump. Water circulating in the water circuit 3 can be heated to a suitable temperature by means of a water heater 6 such as a thermoblock, a cartridge heater, a boiler or any other suitable heating device. In parallel, a steam supply circuit 7 is provided which comprises a second water pump 8 for transporting water from the reservoir to a steam generator 9. The water and steam circuits 3, 7 can meet at an intersection point before the injection head where a directing valve 10 (e.g., a three-way valve) is provided. The valve 10 has the function of selectively directing water or steam to the downstream portion 31 of the water circuit and to the injection head 4. Therefore, downstream of the valve, the steam and water circuits merge into one single fluid line up to the tip of the injection system. The valve can be a ceramic valve, a solenoid valve, insulation or membrane valve or any other type of selective valves. A controller 11 is also provided to automatically control the operations of the different elements of the circuits, i.e., the pumps 5, 8, the heater 6 and steam generator 9, the directing valve 10, as well as motors (not shown) for moving the different mobile parts of the device in the handling and ejection of the capsule.

According to a general aspect of the invention, the injection head comprises injection means forming at least one intruding part 12 that, at the liquid preparation stage, is inserted in the capsule 20 for delivering water in the capsule. Water in the capsule is necessary to obtain brewing, dissolution and/or dispersion of the food and/or nutritional ingredient contained in the capsule and form a liquid composition that can be delivered out of the capsule. The intruding part can be designed to inject water at a certain velocity and according to a certain jetting or spraying pattern and/or direction that promote the reconstitution of the liquid composition or brewing of the ingredients.

According to another general aspect of the invention, for cleaning and/or sanitizing purpose of the intruding part 12, a collecting cover 13 is provided that engages the injection head 4 in a manner to place the part 12 in a confined cleaning-steaming environment. A confined cleaning-steaming environment can be, for instance, obtained by a cup-shaped cover which forms a small free volume 14 around the intruding part and therefore promote the turbulent circulation and contact time of cleaning agent, hot water or steam with the protruding part for a certain time during the cleaning or sanitizing operation. The collecting cover 13 is however connected to a drain 16, preferably a dedicated reservoir (e.g., a "drip tray") of the device. Eventually, a condenser 15 can be provided to remove the waste steam and transform it into liquid. In the case of liquid cleaning agent (other than heated water or steam) such as a chemical cleaning and/or descaling agents, the cover acts in the same way as for steaming. The liquid agent is allowed to become in contact with the external surfaces of the needle. The chemical cleaning or descaling agent can be inserted in a reservoir which is separate from the water reservoir or alternatively, can be inserted in the same reservoir as a tablet or liquid form by the user. Preferably, the cavity of the cover 13 is preferably narrow. It comprises internal surfaces which are placed close to the surfaces of the injection intruding part, e.g., the needle, so that liquid or steam is forced by the surfaces of the cover to thoroughly contact the surfaces of the intruding needle before it is drained. Hence a relatively short gap between the cover's inner surfaces and the part is preferred. For instance, a distance of no more than 10 mm between the surfaces of the cavity and the needle is preferred. A close gap also ensures that the sanitizing fluid does not cool down before it contacts the sensitive surfaces and so that the sanitizing operation on all the sensitive surfaces is effective.

Figure 2:
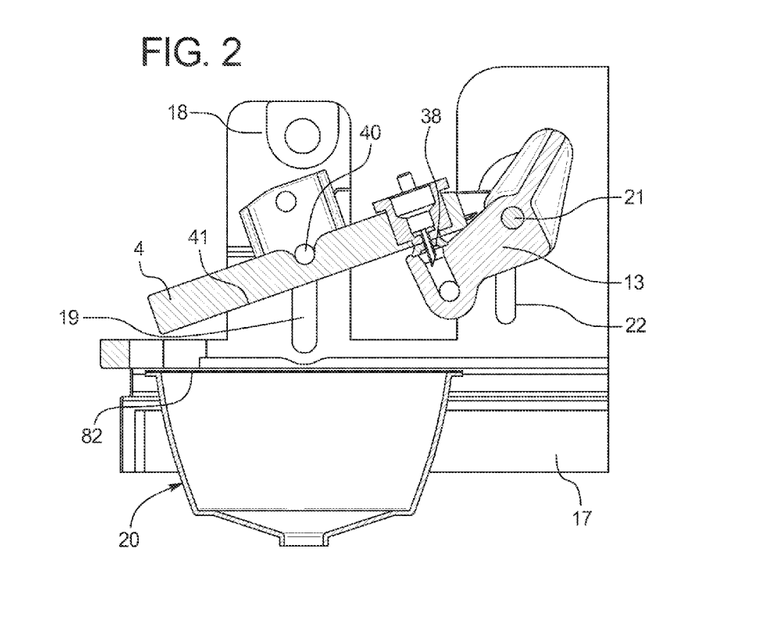
FIG. 2 shows a cross sectional view, in a possible embodiment, of a part the dispensing device, in particular, the injection head and capsule when spaced apart and the collecting cover associated to the head for cleaning and/or sanitizing.
Figure 3:
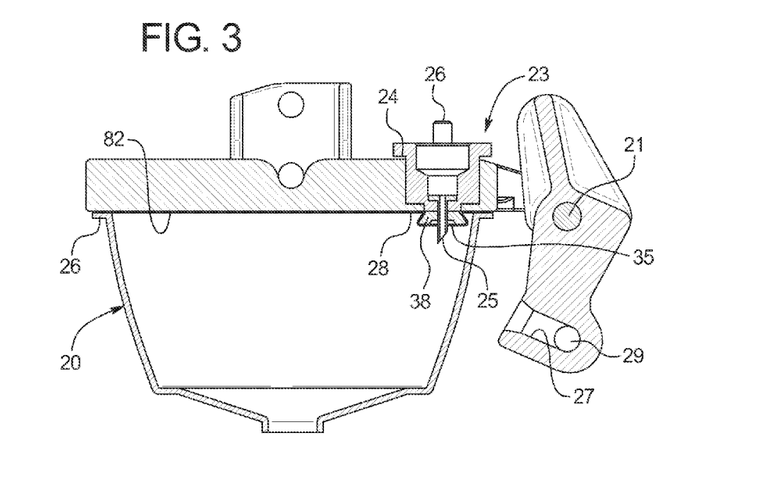
FIG. 3 shows a cross sectional view of a part of the dispensing device, in particular, the injection head when associated to a capsule during water injection (capsule holder removed)

FIGS. 2 and 3 illustrate in more detailed views, other aspects of the invention. In FIG. 2, the capsule is shown in place on a capsule holder 17. The capsule can be inserted in different ways in the capsule holder 17 such as by a gravity fall while the capsule holder is placed horizontally away from the injection head for the capsule loading. The capsule holder can be moved after insertion of the capsule below an injection head 4. As shown, the injection head may comprise a head support 18 for the head to move relatively to the capsule holder. Importantly, it can also be noted that the head may be fixed to the support 18 in a non-moving position and the capsule holder made moveable to move toward the injection head in the vertical direction.

Through the injection head 4 is provided a water injecting system 23. The injecting system has an injecting block 24 which is inserted in the head and terminates by a needle 25 forming the injection intruding part. The needle is intended to pierce a water inlet in the inlet wall, e.g., a membrane 82, of the capsule. The needle is hollow and has a small outlet diameter to allow water to pass therethrough at a relatively high velocity which thus permits to promote a proper and rapid dissolution of the ingredient in the capsule. As shown also, the water injection system is connected upstream via a connector 26 to a water tube of the water and steam circuits (not shown). It must be noted that the intruding part could be designed in a different manner. For instance, the number of needles is not so critical and more than one needle could be designed. In this case, the cleaning/sanitizing cover could be large enough with one large or individual cavities to cover all the needles at once or alternatively several covers could be provided to cover each individual needles. Also, the needles could be designed with no water through-holes but the water outlet could be provided in a close but separate area. The needle may comprise a capillary conduit forming a liquid meniscus that prevents dripping after injection. The needles could also be replaced by a non-piercing fluid connecting element that engages on a through-hole of the capsule.

For example, FIG. 2 shows the injection head being mounted along a vertical guiding (linear) path 19 to move up and down relatively to the capsule and capsule holder. For instance, the head can comprises a pivot axis 40 which can is slide in vertical slot 19 to enable the displacement of the injection between its disengaged position (FIG. 2) to its engaged position (FIG. 3) relative to the capsule holder 17. On the side of the capsule holder is mounted in a rotational manner a collecting cover 13. The cover is mounted along rotational axis 21. A cam means comprising a vertically oriented slot 22 of the head support also forces the collecting cover to pivot relatively to the head when the head is moved up and down. Therefore, when the injection head is moved away from the capsule holder, the cover is forced by the cam means to engage on the injection head and to cover the injection intruding part, i.e., the needle 25, of the injection system.

The collecting cover 13 can take different designs. In the one illustrated in FIGS. 2 and 3, the cover 13 has a cup-shaped cavity 27 that opens upwardly. As already mentioned, the cavity has surfaces which are placed close to the needle when the cover is in the contact position with the head for cleaning or sanitizing. The cover can be made in a rubber elastic material for enhancing fluid tightness with the base 28 of the injection system. As shown in FIG. 2, the base of the injection system could comprise a rubber elastic sealing means 38, e.g., a rubber ring, for creating a seal arrangement at the injection inlet 35 of the capsule rather than at the peripheral edge 26 of the capsule. The advantage is that only a local part of the injection head is in contact with the liquid in the capsule and liquid is prevented from flowing out of the water inlet (FIG. 3). Therefore, only the surfaces of the needle can be contaminated by liquid. As a result, it is only necessary to clean and/or sanitize the contaminated part which intrudes in the capsule but not the whole lower surface of the injection head. The cover 13 can be kept in the form of a relatively small cap having a width that is much smaller than the width of the injection head or capsule holder.

The sealing means 38 also acts for sealing with the upper edge of the cover 13. In this case, the cover can be made in a rigid food grade plastic material that can resist to steam temperature such as polypropylene. The rubber elastic means participates to the fluid-tightness created between the cover and the injection head when the cover is applied against the head in the cleaning/sanitizing procedure(s). Of course, the sealing means 38 can be applied on the whole surface of the head 14 rather than locally at the base of the needle 25. For instance, the sealing means could be a rubber elastic layer covering the lower surface 41 of the head 4.

In the bottom of the cavity 27 of the cleaning/sanitizing cover 13 is provided an outlet 29 for enabling the cleaning and/or sanitizing agent, e.g., steam, to escape the cover and be drained through the system right to a dedicated reservoir 16, via a condenser so that steam can be transformed into liquid before being collected and discarded in the reservoir.

Figure 4:
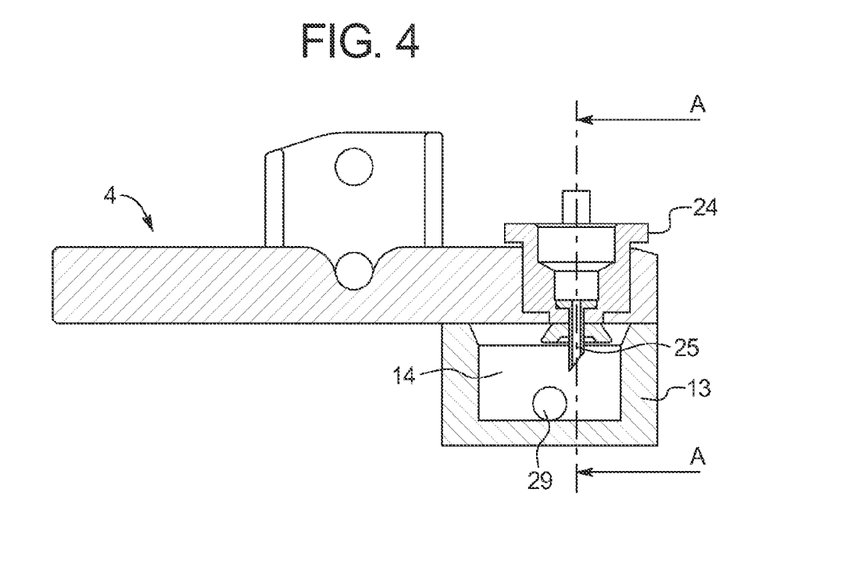
FIG. 4 shows a cross sectional view of a detail of the injection part and collecting cover according to another embodiment.
Figure 5:
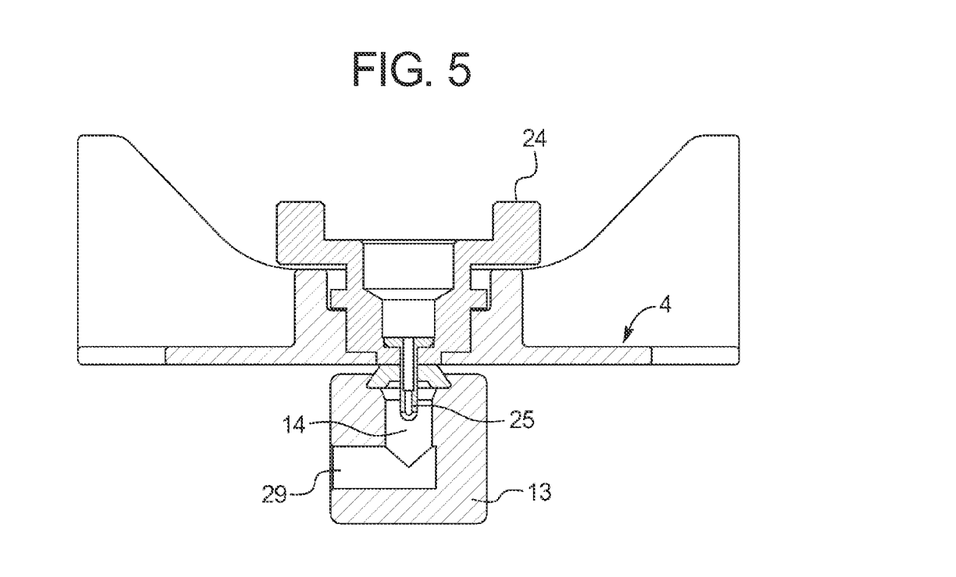
FIG. 5 shows a cross sectional views along line A-A of FIG. 4.

FIGS. 4 and 5 show another embodiment in which the cavity of the collecting cover 13 is made larger, at least in one direction (FIG. 4).

The dispensing device of the invention works in general terms as follows.

A capsule 20 is loaded in the capsule holder 17. Upon a push of a button, the controller 11 activates the capsule holder and moves it below the injection head and then upwardly relatively to the injection head. The capsule holder can be moved by a motor driven transport mechanism for instance (not illustrated). Before the injection head and capsule holder are in the position of engagement of FIG. 3 or, eventually, if the dispensing device has been at rest for a too long time, as determined by an internal clock, a cleaning and/or sanitizing cycle is carried out automatically. In the disengaged position of the injection head and capsule holder of FIG. 2, the collecting cover 13 is so automatically in engagement with the injection head by the cam means. Hence, the controller activates the pump 8, the steam generator 9 and valve 10 to provide steam to the injection head. In this mode, the collecting cover is associated to the injection head in a fluid tight manner relative to the surroundings of the head in the device. Steam is circulated during a certain time as predetermined by the controller. The controller typically holds a memory with cleaning/sanitizing programs adapted to run the cleaning/sanitizing cycles by setting automatically the key parameters: e.g., heater temperatures, pumping time, flow rate, frequency, etc. The duration of steaming may be dependent on different factors such as the microbial sensitivity of the food and/or nutritional components passed through the capsule, the time the dispensing device has not been used, etc. The controller may thus control different steaming times. In a preferred embodiment a short steaming in the order of 10 to 20 seconds for example is carried out before and/or after any product dispensing cycle in order to sanitize the fluid system. The cleaning/sanitizing and product delivery cycles can be done at the single push of a button, e.g., for activating a product preparation cycle. In particular, the cleaning/sanitizing procedure is carried out automatically after each product dispensing cycle when the injection head and capsule holder come back to the disengaged position. Alternatively, cleaning/sanitizing can be carried out by a specific activation of a command which is distinct from the product preparation command.

In a next operation, the injection head and the capsule holder are approached relatively one another either manually or automatically. The controller then runs the preparation cycle in a common way known in the art, e.g., activating the water pump 5, water heater 6 and valve 10.

Figure 6:
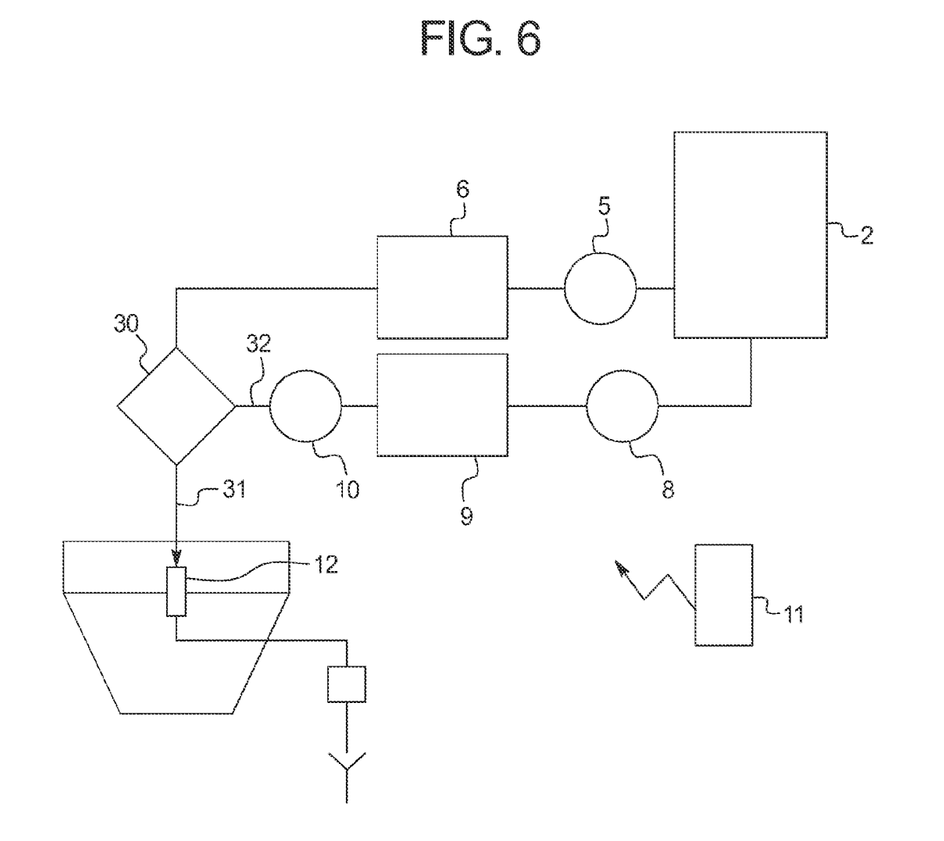
FIG. 6 shows schematically another embodiment of the dispensing device of the invention.

FIG. 6 illustrates a dispenser with a filter, e.g., an anti-microbial filter, as described in the co-pending patent application No. 06117801.8. The steam circuit may be connected by the valve 10 just below the filter membrane of filter 30. Cleaning in this configuration cleans the filter 30, the needle 12 as well as the pipes 31 and 32. This cleaning prevents the growth of biofilm that would contaminate water after filtration through filter 30. In particular, the steam line can be connected to the downstream surface of the bacterial filter to periodically clean or sanitize the outlet face of the filter or the steam line can be connected at the upstream of the filter. The circuit may further comprise an air pump for emptying the capsule from liquid and purging the circuit from liquid before steaming.

The capsule may be configured to suit the dispensing device provided always that the configuration is such as to enable opening at the delivery side of the capsule in such a way as to allow liquid to drain directly from the capsule into a receiving vessel and that opening of the capsule is operable in response to pressure conditions generated in the capsule by the introduction of water into the capsule. Various suitable capsule configurations of this type are disclosed in international patent application WO 03/059778. However, it can be noted that other types of capsule can be used.

The invention finds an important application for preparing by the dispenser an infant preparation from a capsule containing an infant formula or for other food or nutritional sensitive products.

The invention claimed is:

1. Dispensing device for preparing and dispensing a food and/or nutritional composition from a capsule, the dispensing device comprising:
   a water circuit for transporting water,
   a water heater,
   an injection head comprising an injection intruding part for injecting water in a capsule comprising a food and/or nutritional ingredient;
   a capsule holder for holding the capsule during injection of water in the capsule,
   the injection head and capsule holder being moveable relative to one another so that the injection head can inject water in the capsule, and cleaning and/or sanitizing means for injecting a cleaning and/or sanitizing agent in at a least a portion of the water circuit and through the injection intruding part, the cleaning and/or sanitizing means comprising a dedicated collecting cover which can be associated in engagement with the injection head for collecting and discarding the cleaning agent after the cleaning agent has passed through the injection intruding part and when the injection head and the capsule holder are moved apart relative to each another.

2. Dispensing device according to claim 1, wherein the dedicated collecting cover can be associated in engagement with the injection head for forcing the cleaning agent to clean and/or sanitize the external surface of the injection intruding part.

3. Dispensing device according to claim 1, wherein the cleaning and/or sanitizing agent is hot water and/or steam.

4. Dispensing device according to claim 3, wherein the injection intruding part comprises at least one needle that is designed to be inserted through a wall of the capsule.

5. Dispensing device according to claim 1, wherein the injection head comprises a fluid-tight sealing means configured for providing a sealing arrangement at least around the injection intruding part.

6. Dispensing device according to claim 1, wherein the cleaning and/or sanitizing means comprises a steam generator for introducing steam through the injection intruding part.

7. Dispensing device according to claim 1, wherein the dedicated collecting cover is designed to engage the injection intruding part only when the capsule holder and injection head are disengaged.

8. Dispensing device according to claim 7, wherein the cover is mechanically associated with the injection head or capsule holder so that when the injection head and/or capsule holder are moved apart, the cover head is automatically moved into the engaging position relative to the injection intruding part.

9. Dispensing device according to claim 8, wherein the cover is forced by cam means to move between the engaging and disengaging positions in a coordinated manner as the injection head is moved apart relative to the capsule holder.

10. Dispensing device according to claim 8, wherein the cover is mounted by a pivot on the injection head.

11. Dispensing device according to claim 1, wherein the collecting cover is connected to a dedicated reservoir in the device for removal of the cleaning and/or sanitizing agent.

12. Dispensing device according to claim 1, wherein the collecting cover engages the injection head in a fluid-tight manner.

13. Dispensing device according to claim 1, wherein the water circuit comprises a bacterial filter.

14. Dispensing device according to claim 1, comprising a controller for automatically operating a cleaning and/or sanitizing operation.

15. Dispensing device according to claim 1, wherein the cleaning and/or sanitizing agent comprises a chemical agent.

16. Dispensing device according to claim 2, wherein the cleaning and/or sanitizing agent is hot water and/or steam.

17. Dispensing device according to claim 16, wherein the injection intruding part comprises at least one needle that is designed to be inserted through a wall of the capsule.

18. Dispensing device according to claim 2, wherein the injection head comprises a fluid-tight sealing means configured for providing a sealing arrangement at least around the injection intruding part.

19. Dispensing device according to claim 2, wherein the cleaning and/or sanitizing means comprises a steam generator for introducing steam through the injection intruding part.

20. Dispensing device according to claim 2, wherein the dedicated collecting cover is designed to engage the injection intruding part only when the capsule holder and injection head are disengaged.

21. Dispensing device according to claim 20, wherein the cover is mechanically associated to the injection head or capsule holder so that when the injection head and/or capsule holder are moved apart, the cover head is automatically moved into the engaging position relative with the injection intruding part.

22. Dispensing device according to claim 20, wherein the cover is forced by cam means to move between the engaging and disengaging positions in a coordinated manner as the injection head is moved apart relative to the capsule holder.

23. Dispensing device according to claim 20, wherein the cover is mounted by a pivot on the injection head.

24. Dispensing device according to claim 2, wherein the collecting cover is connected to a dedicated reservoir in the device for removal of the cleaning and/or sanitizing agent.

25. Dispensing device according to claim 2, wherein the collecting cover engages the injection head in a fluid-tight manner.

26. Dispensing device according to claim 2, wherein the water circuit comprises a bacterial filter.

27. Dispensing device according to claim 2, comprising a controller for automatically operating a cleaning and/or sanitizing operation.

28. Dispensing device according to claim 2, wherein the cleaning and/or sanitizing agent comprises a chemical agent.

29. Dispensing device according to claim 1, wherein the dedicated collecting cover is a cup-shaped cover that engages the injection head to form a confined cleaning environment.

30. Dispensing device according to claim 1, wherein the injection head is designed to move relative to the capsule holder and the dedicated collecting cover.

* * * * *